(12) United States Patent
Hosseini

(10) Patent No.: US 10,144,088 B2
(45) Date of Patent: Dec. 4, 2018

(54) METHOD AND APPARATUS FOR LASER PROCESSING OF SILICON BY FILAMENTATION OF BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES LLC, Plymouth, MI (US)

( * ) Notice: Subject to any disclaimer, the term of this patent is extended or adjusted under 35 U.S.C. 154(b) by 871 days.

(21) Appl. No.: 14/556,078

(22) Filed: Nov. 28, 2014

(65) Prior Publication Data

US 2015/0151380 A1     Jun. 4, 2015

Related U.S. Application Data

(60) Provisional application No. 61/911,345, filed on Dec. 3, 2013.

(51) Int. Cl.
   *B23K 26/00*     (2014.01)
   *B23K 26/40*     (2014.01)
   (Continued)

(52) U.S. Cl.
   CPC ........ *B23K 26/009* (2013.01); *B23K 26/0617* (2013.01); *B23K 26/0648* (2013.01);
   (Continued)

(58) Field of Classification Search
   CPC B23K 26/009; B23K 26/364; B23K 26/0057; B23K 26/0617; B23K 26/0648; B23K 26/08; B23K 26/40
   See application file for complete search history.

(56) References Cited

U.S. PATENT DOCUMENTS

| 5,107,510 A | 4/1992 | Seguin et al. |
| 5,567,336 A | 10/1996 | Tatah |
| (Continued) | | |

FOREIGN PATENT DOCUMENTS

| CA | 2332154 | 9/2009 |
| CA | 2907757 | 9/2014 |
| (Continued) | | |

OTHER PUBLICATIONS

Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.

(Continued)

*Primary Examiner* — Queenie S Dehghan
(74) *Attorney, Agent, or Firm* — Woodling, Krost and Rust

(57) ABSTRACT

A method for laser processing of Silicon includes placing a Kerr material into engagement with the Silicon forming an interface therebetween. A laser beam is applied having at least one subpulse in a burst envelope operating at a first wavelength. The laser beam passes through a distributive lens focusing assembly and to the Kerr material. The first wavelength is modified to a plurality of second wavelengths, some of which are effective for processing Silicon. Photoacoustic compression processing is produced by the laser pulse energy by a portion of second wavelengths delivered through the interface and to the Silicon which initiates Kerr Effect self focusing which is propagated in the Silicon by additional energy input to the Silicon thus producing a filament within the Silicon.

5 Claims, 13 Drawing Sheets

(51) Int. Cl.
  *B23K 26/06* (2014.01)
  *B23K 26/08* (2014.01)
  *B23K 26/53* (2014.01)
  *B23K 26/364* (2014.01)
  *B23K 103/00* (2006.01)

(52) U.S. Cl.
  CPC ............ *B23K 26/08* (2013.01); *B23K 26/364* (2015.10); *B23K 26/40* (2013.01); *B23K 26/53* (2015.10); *B23K 2103/50* (2018.08); *Y10T 225/12* (2015.04); *Y10T 428/12389* (2015.01); *Y10T 428/24612* (2015.01)

(56) References Cited

U.S. PATENT DOCUMENTS

| | | |
|---|---|---|
| 5,609,284 A | 3/1997 | Kondratenko |
| 6,084,897 A | 7/2000 | Wakabayashi et al. |
| 6,333,485 B1 | 12/2001 | Haight et al. |
| 6,407,360 B1 | 6/2002 | Choo et al. |
| 6,417,485 B1 | 6/2002 | Troitski |
| 6,552,301 B2 | 4/2003 | Herman et al. |
| 7,033,519 B2 | 4/2006 | Taylor et al. |
| 7,211,184 B2 | 5/2007 | Webster et al. |
| 7,218,448 B1 | 5/2007 | Cathey, Jr. et al. |
| 7,303,977 B2 | 12/2007 | Voronov et al. |
| 7,605,344 B2 | 10/2009 | Fukumitsu |
| 7,626,138 B2 | 12/2009 | Bovatsek et al. |
| 8,097,830 B2 | 1/2012 | Woeste et al. |
| 8,624,157 B2 | 1/2014 | Albelo et al. |
| 8,835,802 B2 | 9/2014 | Baer |
| 8,842,358 B2 | 9/2014 | Bareman et al. |
| 8,852,698 B2 | 10/2014 | Fukumitsu |
| 9,102,007 B2 | 8/2015 | Hosseini |
| 9,102,011 B2 | 8/2015 | Hosseini |
| 2002/0125232 A1 | 9/2002 | Choo et al. |
| 2002/0195433 A1 | 12/2002 | Troitski |
| 2003/0006221 A1 | 1/2003 | Hong et al. |
| 2003/0072890 A1 | 4/2003 | Miyazawa |
| 2004/0017428 A1 | 1/2004 | Cronin et al. |
| 2004/0248503 A1 | 12/2004 | Benderly |
| 2005/0006361 A1 | 1/2005 | Kobayashi et al. |
| 2005/0186760 A1 | 8/2005 | Hashimura et al. |
| 2005/0269301 A1 | 12/2005 | Burrowes et al. |
| 2005/0272223 A1 | 12/2005 | Fujii et al. |
| 2006/0099810 A1 | 5/2006 | Voronov et al. |
| 2006/0108339 A1 | 5/2006 | Nishiwaki et al. |
| 2006/0207976 A1 | 9/2006 | Bovatsek et al. |
| 2007/0051706 A1 | 3/2007 | Bovatsek et al. |
| 2007/0298529 A1 | 12/2007 | Maeda et al. |
| 2009/0151996 A1 | 6/2009 | Mishima et al. |
| 2009/0294422 A1 | 12/2009 | Lubatschowski et al. |
| 2010/0025387 A1 | 2/2010 | Arai et al. |
| 2010/0084384 A1 | 4/2010 | Bovatsek et al. |
| 2010/0279067 A1 | 11/2010 | Sabia et al. |
| 2011/0259631 A1 | 10/2011 | Rumsby |
| 2012/0234807 A1 | 9/2012 | Sercel et al. |
| 2012/0235969 A1 | 9/2012 | Burns et al. |
| 2013/0126573 A1 | 5/2013 | Hosseini et al. |
| 2013/0183837 A1 | 7/2013 | Arai et al. |
| 2013/0293482 A1 | 11/2013 | Burns et al. |
| 2014/0079570 A1 | 3/2014 | Schweitzer et al. |
| 2014/0199519 A1 | 7/2014 | Schillinger et al. |
| 2014/0213040 A1 | 7/2014 | Morikazu et al. |
| 2014/0248757 A1 | 9/2014 | Morikazu et al. |
| 2014/0340730 A1 | 11/2014 | Bergh et al. |
| 2015/0034612 A1* | 2/2015 | Hosseini ............ B23K 26/0069 219/121.61 |
| 2015/0166393 A1 | 6/2015 | Marjanovic et al. |
| 2015/0166394 A1 | 6/2015 | Marjanovic et al. |
| 2015/0360991 A1 | 12/2015 | Grundmueller et al. |
| 2015/0367442 A1 | 12/2015 | Bovatsek et al. |
| 2016/0009586 A1 | 1/2016 | Bookbinder et al. |
| 2016/0031745 A1 | 2/2016 | Ortner et al. |
| 2016/0059359 A1 | 3/2016 | Krueger et al. |
| 2016/0060156 A1 | 3/2016 | Krueger et al. |

FOREIGN PATENT DOCUMENTS

| | | |
|---|---|---|
| CN | 102785031 | 4/2015 |
| EP | 2781296 | 9/2014 |
| EP | 2898982 A2 | 12/2014 |
| EP | 2868421 A1 | 5/2015 |
| EP | 2754524 | 11/2015 |
| JP | 2006305803 | 11/2006 |
| JP | 2009066627 A | 4/2009 |
| JP | 2010160734 | 7/2010 |
| JP | 4692717 | 3/2011 |
| JP | 5089735 | 9/2012 |
| JP | 5271092 | 5/2013 |
| WO | 0125137 A1 | 4/2001 |
| WO | 2009114375 A2 | 9/2009 |
| WO | 2010111089 A2 | 9/2010 |
| WO | 2012006736 | 1/2012 |
| WO | 2012094737 A1 | 7/2012 |
| WO | 2014075995 | 5/2014 |
| WO | 2014079570 | 5/2014 |
| WO | 2014111385 | 7/2014 |
| WO | 2014111794 | 7/2014 |
| WO | 2014121261 | 8/2014 |
| WO | 2014134470 | 9/2014 |
| WO | 2014144322 | 9/2014 |
| WO | 2014147048 | 9/2014 |
| WO | 2014161535 | 10/2014 |
| WO | 2015075059 | 5/2015 |
| WO | 2015094994 | 6/2015 |
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

Nguyen et al., Optical Breakdown Versus Filamentation in Fused Silica by Use of Femtosecond Infrared Laser Pulses, Optics Letter, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 1-4.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.

Hosseini, S. Abbas, System for Performing Laser Filamentation Within Transparent Materials, U.S. Appl. No. 14/336,912, filed Jul. 21, 2014, Applicant: Rofin-Sinar Technologies Inc.

Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.

Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.

Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies Inc.

Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.

Applied Biosystems Chemistry Guide, DNA Sequencing by Capillary Electrophoresis, Second Edition, 2009, pp. 1-310.

(56) References Cited

OTHER PUBLICATIONS

PE Applied Biosystems, Automated DNA Sequencing, Chemistry Guide, 1998, pp. 1-245.
Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.
Muller et al, Short-Pulse Lasers Enable Transparent Materials Processing, Industrial Photonics, Oct. 2014, pp. 8-10.
Hosseini, S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies Inc.
Migliore et al., Advances in Laser Singulation of Silicon, Paper #770, pp. 1-6, Coherent, Inc., Santa Clara, CA, USA; HBL Corporation, Daejeon 305-811 Korea.
Watanabe et al., Filamentation in Ultrafast Laser Material Processing, Book for Springer Series "Progress in Ultrafast Intense Laser Science", pp. 1-6.
Yoshino et al., Micromachining With a High Repetition Rate Femtosecond Fiber Laser, JLMN—Journal of Laser Micro/Nanoengineering, 2008, pp. 157-162, vol. 3, No. 3.
Nguyen et al., Optical Breakdown Versus Filamentation in Fused Silica by Use of Femtosecond Infrared Laser Pulses, Optics Letters, vol. 28, No. 17, Sep. 1, 2003, pp. 1591-1593, Department of Physics, Universite Laval, Quebec, Canada.
Applied Biosystems Chemistry Guide, DNA Sequencing by Capillary Electrophoresis, Second Edition, 2009, pp. 1-250.
Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies Inc.
Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.
Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.
Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.
Hosseini et al., Measurement of Filament Length Generated by an Intense Femtosecond Laser Pulse Using Electromagnetic Radiation Detection, Applied Physics B, 2003, pp. 583-586, vol. 76, Quebec, Canada.
Hosseini et al., Multi-Parameter Characterization of the Longitudinal Plasma Profile of a Filament: A Comparative Study, Applied Physics B, 2004, pp. 519-523, vol. 79.
Hosseini et al., Competition of Multiple Filaments During the Propagation of Intense Femtosecond Laser Pulses, The American Physical Society, Physical Review A 70, 033802, 2004, pp. 1-12.
Hossieni, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.
Strigin et al., Laser Processing of Glass by Picosecond Pulses, Quantum Electronics, 1994, pp. 732-735, vol. 24, No. 8, Kvantovaya Elektronika and Turpion Ltd.
Bhuyan et al., High Aspect Ratio Taper-Free Microchannel Fabrication Using Femtosecond Bessel Beams, Optics Express, Jan. 18, 2010, pp. 566-574, vol. 18, No. 2.
European Patent Office, Extended European Search Report, dated Mar. 18, 2015, pp. 1-6, Application No. 14179302.4, Applicant: Rofin-Sinar Technologies, Inc.
Hosseini et al., Measurement of a Filament Length Generated by an Intense Femtosecond Laser Pulse Using Electromagnetic Radiation Detection, Applied Physics B, 2003, pp. 583-586, vol. 76, Quebec, Canada.
Hosseini et al., Competition of Multiple Filaments During the Propagation of Intense Femtosecond Laser Pulses, The Americal Physical Society, Physical Review A 70, 033802, 2004, pp. 1-12.
Arnold et al., Laser Direct-Write Techniques for Priting of Complex Materials, MRS Bulletin, Jan. 2007, vol. 32 pp. 23-31.
Nagel et al., Laser-Induced Forward Transfer for the Fabrication of Devices, Nanomaterials: Processing and Characterization With Lasers, First Edition, 2012, Published by Wiley-VCH Verlag GMBH & Co. KGAA, pp. 255-316.
Palla-Papavlu et al., Laser Induced Forward Transfer for Materials Patterning, Romanian Reports in Physics, Aug. 2011, vol. 63, Supplement, pp. 1285-1301.
Pique et al., Digital Microfabrication by Laser Decal Transfer, JLMN—Journal of Laser Micro/Nanoengineering, 2008, vol. 3, No. 3, pp. 163-169.
European Patent Office, European Search Report, dated May 18, 2015, pp. 1-6, Application No. 14193909.0, Applicant: Rofin-Sinar Technologies, Inc.
Gill, Jonathan, Creating an Exotic New Form of Light With Simple Optical Elements, Nov. 2014, pp. 1-21, Waldorf School of Garden City, Garden City, New York, Laser Teaching Center Department of Physics and Astronomy, Stony Brook University, Intel Science Talent Search.
Dowski et al, Extended Depth of Field Through Wave-Front Coding, Applied Optics, Apr. 10, 1995, vol. 34, No. 11, pp. 1859-1866.
Arnison et al., High Resolution Extended Depth of Field Microscopy Using Wavefront Coding, pp. 1-19.
Siviloglou, Georgios A., Accelerating Optical Airy Beams, Dissertation, 2010, pp. 1-166.
Hosseini, S. Abbas, Method and Apparatus for Laser Processing of Silicon by Filamentation of Burst Ultrafast Laser Pulses, U.S. Appl. No. 14/556,078, filed Nov. 28, 2014, Applicant: Rofin-Sinar Technologies, Inc.
Hosseini, S. Abbas, Method and Apparatus for Material Processing Using Multiple Filamentation of Burst Ultrafast Laser Pulses, U.S. Appl. No. 14/629,327, filed Feb. 23, 2015, Applicant: Rofin-Sinar Technologies, Inc.
Hosseini, S. Abbas, Method and System for Scribing Heat Processed Transparent Materials, U.S. Appl. No. 14/700,228, filed Apr. 30, 2015, Applicant: Rofin-Sinar Technologies, Inc.
Hosseini, S. Abbas, Method and Apparatus for Performing Laser Curved Filamentation Within Transparent Materials, U.S. Appl. No. 14/742,187, filed Jun. 17, 2015, Applicant: Rofin-Sinar Technologies, Inc.
European Patent Office, Extended European Search Report, dated Jul. 29, 2015, pp. 1-8, Application No. 14193908.2, Applicant: Rofin-Sinar Technologies, Inc.
European Patent Office, Extended European Search Report, dated Jul. 14, 2015, pp. 1-14, Application No. 14195892.6, Applicant: Rofin-Sinar Technologies, Inc.
European Patent Office, Extended European Search Report, dated Feb. 26, 2015, pp. 1-7. Application No. 14193911.6, Applicant: Rofin-Sinar Technologies, Inc.
European Patent Office, Extended European Search Report, dated Mar. 11, 2015, pp. 1-6, Application No. 14191146.1, Applicant: Rofin-Sinar Technologies, Inc.
European Patent Office, Partial European Search Report, dated May 18, 2015, pp. 1-6, Application No. 14193909, Applicant: Rofin-Sinar Technologies, Inc.
European Patent Office, Extended European Search Report, dated Sep. 14, 2015, pp. 1-7, Application No. 14179403.2, Applicant: Rofin-Sinar Technologies, Inc.
European Patent Office, Extended European Search Report, dated Sep. 24, 2015, pp. 1-13, Application No. 14193909, Applicant: Rofin-Sinar Technologies, Inc.

\* cited by examiner

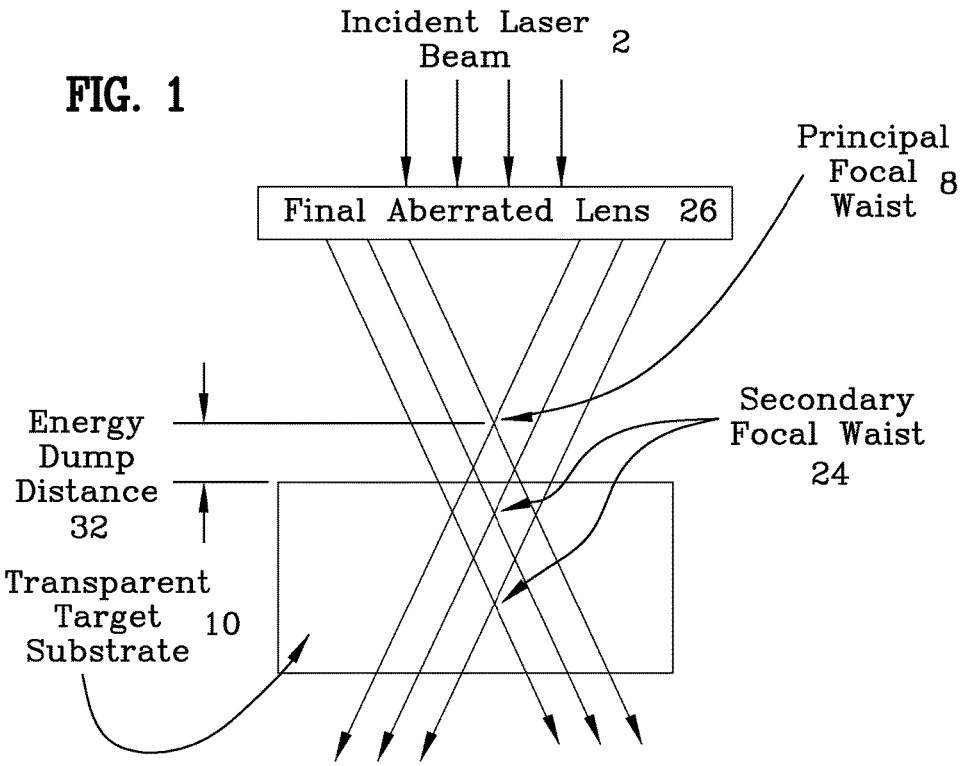
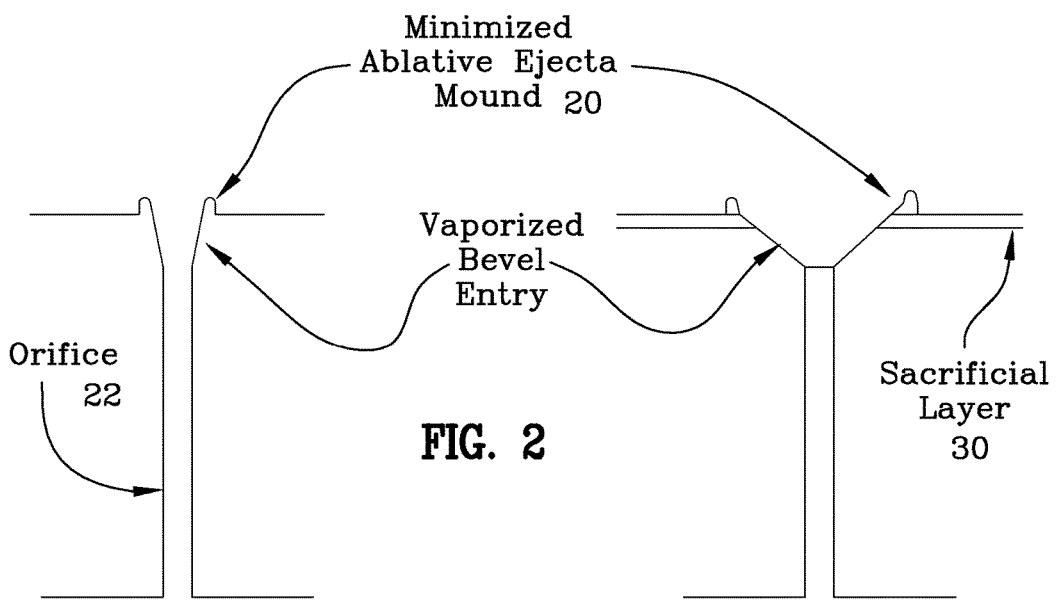

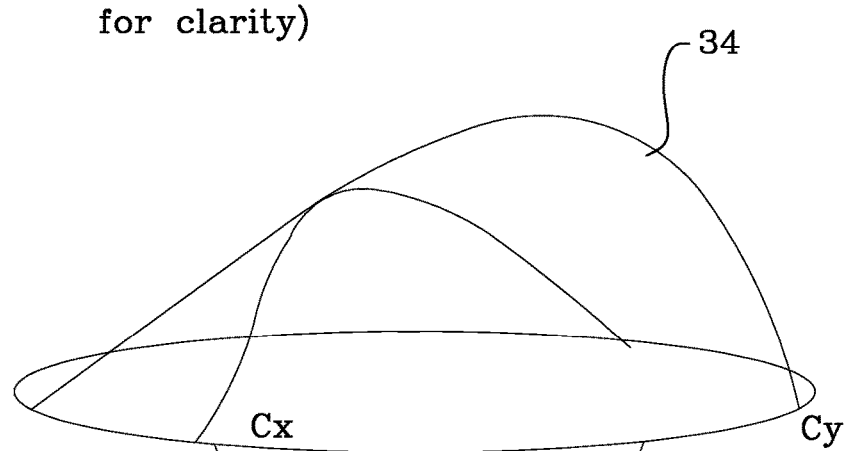
Non Spherical/Spherical Lens
(uncorrected and exaggerated
for clarity)
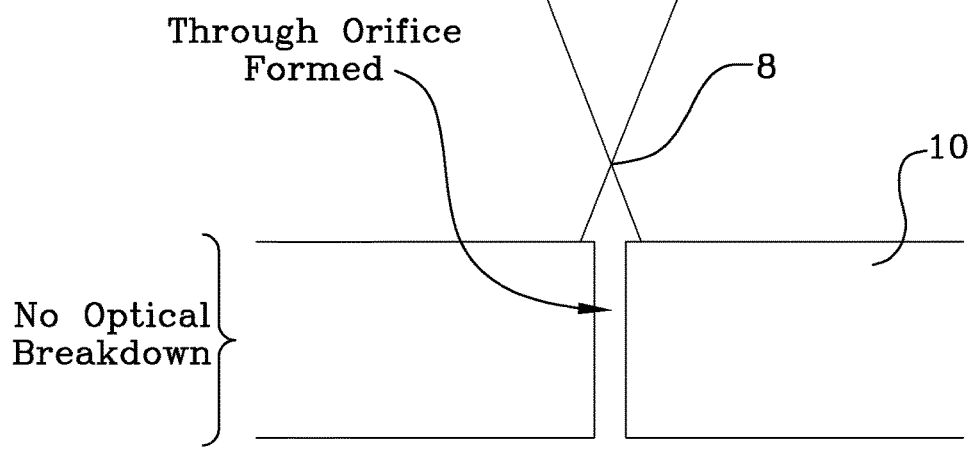
FIG. 3

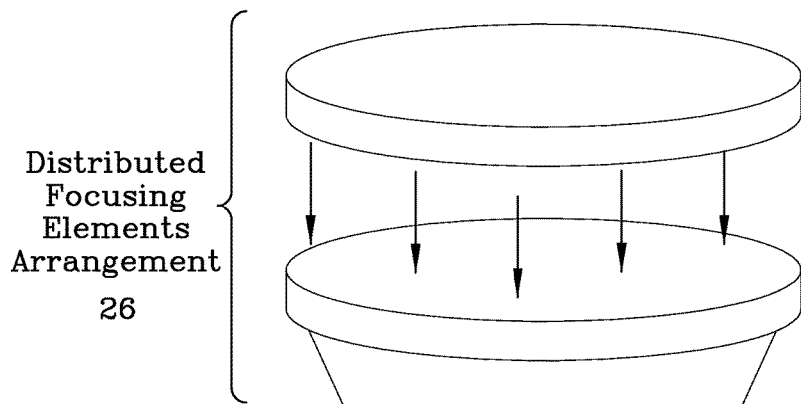
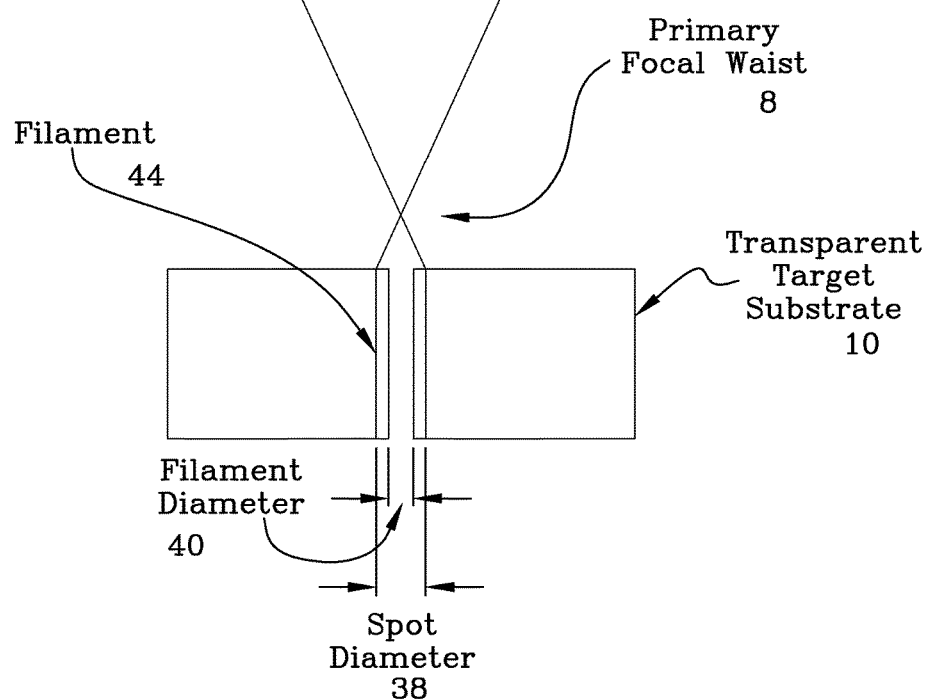
FIG. 4

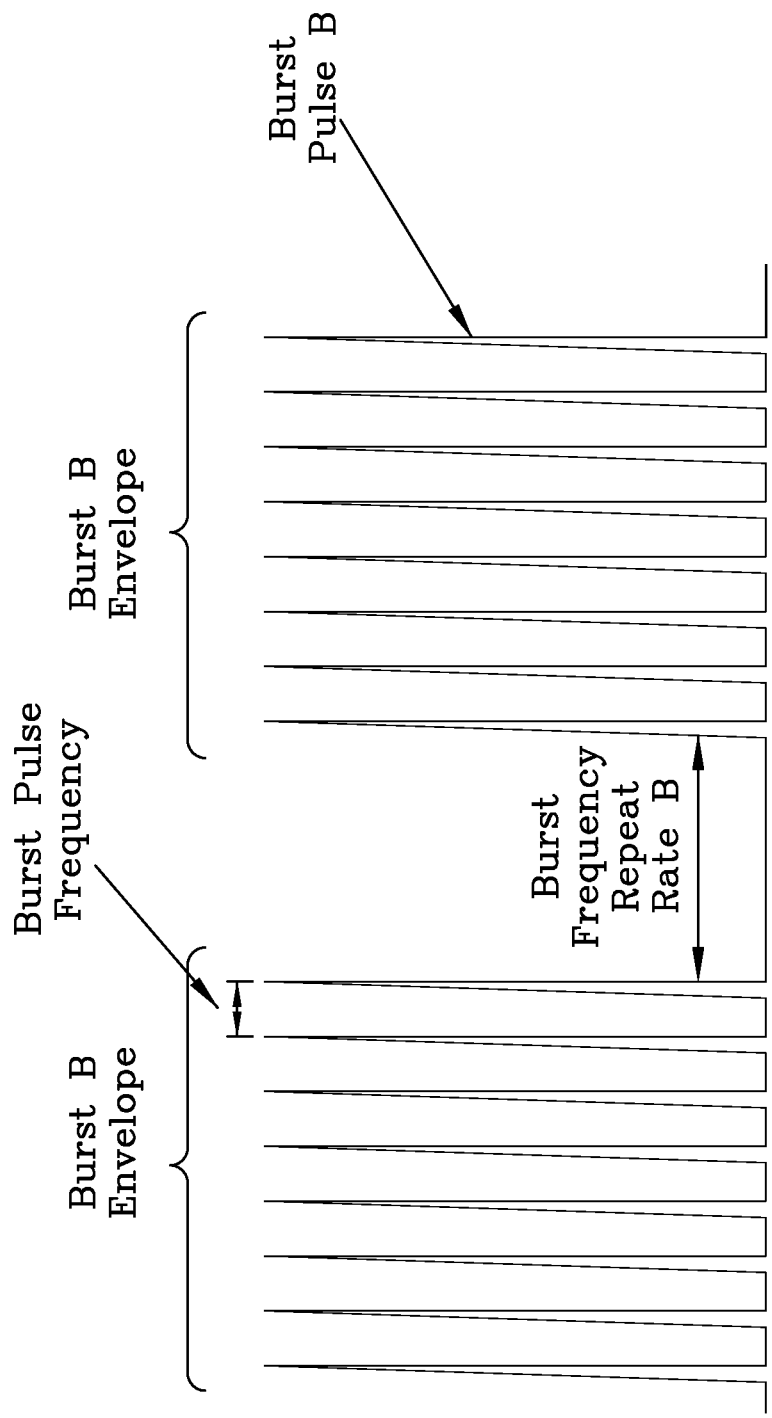

METHOD AND APPARATUS FOR LASER PROCESSING OF SILICON BY FILAMENTATION OF BURST ULTRAFAST LASER PULSES

This patent application claims priority to and the benefit of U.S. provisional patent application Ser. No. 61/911,345 filed Dec. 3, 2013. U.S. provisional patent application Ser. No. 61/911,345 filed Dec. 3, 2013 is incorporated herein in its entirety by reference hereto.

BACKGROUND OF THE INVENTION

The present invention relates to a method and apparatus for laser processing of a semiconductor substrate, more specifically, to the high quality laser cutting of monocrystalline and polycrystalline silicon resulting in near-zero kerf cuts with low total roughness, through the use of a standard wavelength laser.

Silicon is transparent to light having a wavelength greater than 1.3 μm. Since the most common lasers (such as YAG lasers) operate in the 1064 nm wavelength range, these lasers produce light that is partially absorbed by silicon and thus are unable to cleanly cut silicon by burst ultrafast pulsed laser induced filamentation techniques owing to the significant linear absorption of the laser pulses. However, they can ablatively laser cut silicon at this wavelength. The same laser parameters and apparatus can be used to cut glass or sapphire via filamentation. Using a tightly focused beam inside the substrate causing optical break down to dice Si thin wafers is also known as stealth dicing invented and developed by Hamamatsu. See U.S. Pat. No. 7,396,742.

To cut silicon by filamentation requires building a laser that operates at a wavelength above 1.3 μm. Alternatively, a method of altering or modifying the 1064 nm wavelength laser beam into a beam of the correct wavelength must be used. One method is to use an optical parametric generator (OPG), or optical parametric amplifier (OPA) or white light generation in an optical Kerr medium.

In optical parametric generation, an input light beam of a given frequency is down converted into two light beams at lower frequency. These two lower-frequency beams are called the "signal" and "idler".

There is a huge demand for laser processing (orifice drilling or cutting) of materials such as silicon. The applications are wide ranging and include such things as semiconductors, microelectronics, filters for air monitoring, particle monitors, cytology, chemotaxis, bioassays, and such, and commonly require very clean, very uniform orifices a few hundred nanometers to tens of micrometers, in diameter. The prior art ablative methods of machining of Silicon with lasers having wavelengths less than 1.3 μm leave very rough cut surfaces, compromise the material with micro cracks, create surface ejecta mounds, create stress zones and are prone to causing large regions of collateral thermal damage. While laser ablation processes can be dramatically improved by selecting lasers with wavelengths that are strongly absorbed by the medium (for example, deep UV excimer lasers or far-infrared $CO_2$ laser), the above disadvantages cannot be eliminated due to the aggressive interactions inherent in this physical ablation process. Further, the prior art laser ablation systems have low throughput times, and cannot attain as close a tolerance machining as can be achieved by the present method.

The present method and apparatus allows for improved processing especially scribing and cutting of silicon, by filamentation by burst ultrafast laser pulses, without the need for a specially built laser that outputs 1.3 μm and greater wavelength. This new invention utilizes and combines known and new technologies in a unique and novel configuration to overcome the aforementioned problems and accomplish this and provides enough confidence and proof to invest in building new lasers that operate in the required wavelength.

SUMMARY OF THE INVENTION

One purpose of the present invention, which will be described subsequently in greater detail, is to provide an apparatus and method for processing orifices and cuts in transparent substrates, specifically materials such as Si without the use of a laser built to operate in the 1.3 μm.

It is also a purpose of the present invention to use filamentation by burst of ultrafast laser pulses with specific adjustments of the laser parameters in conjunction with distributed focus lens assembly that creates a plurality of different foci wherein the principal focal waist never resides in the bulk or on the surface of the target; so as to create a filament in the material that develops an orifice due to photoacoustic compression that can be used to from a scribe or cut line by relative movement between the workpiece and the incident laser beam. The following invention provides a novel method using the interaction of burst ultrafast laser pulses from a laser. Although this invention is described using a common 1064 nm wavelength ultrafast laser pulses, other wavelengths may be used for the incoming laser beam.

A novel and unique technique to create almost zero kerf width cuts and nanometer to micrometer scale orifices in and through transparent material such as Si wafers is disclosed. It has many of the advantages mentioned heretofore and many novel features that result in a new method of producing non-ablative drilled orifices in materials, which is not anticipated, rendered obvious, suggested, or even implied by any of the prior art, either alone or in any combination thereof. Specifically, it offers the following advances over the prior art: smoother orifice sides, minimal microcrack propagation, longer/deeper orifice creation, non tapered orifices, nonlinear absorption, orifices with a consistent internal diameter, minimized entrance distortion and reduced collateral damage and high-speed scribe lines with near zero kerf that results in more devices on semiconductor wafers due to narrower street width (distance between the devices).

The first embodiment of present invention is to convert the 1 μm wavelength laser to above 1.3 μm using OPG or OPA. OPG is easier and quicker to implement. During the optical parametric generation from a 1 μm source, it is possible to tune the OPG crystal such as $LiNbO_3$ to get any wavelength in the range from 1.3 to 1.6 μm as a signal and an idler will follow in a 3-5 μm spectrum. For the purpose of the present invention both the signal and idler can be used as filament forming pulses since Si is transparent to both wavelength spectrums. In most applications the signal or idler can be used and any other beam needs to be dumped. Using both wavelengths is helpful to produce higher efficiency.

Another embodiment of the present invention provides a novel method using the interaction of burst ultrafast laser pulses from a laser. In this method, the laser light and focusing parameters have been adjusted to propagate through a layer such as sapphire or borosilicate glass or thin layer of water located on top of a silicon wafer to create a filament inside the silicon beneath the layer. The filament creates an orifice by photoacoustic compression of specified depth and width at the desired point of initiation and point of termination by making use of wavelengths longer than the 1064 nm incident beam. It is well known that interaction of ultrafast laser pulses with Kerr materials can generate a supercontinuum or white light. It causes a wavelength shift, and, as such, the longer wavelength portions of the spectrum can penetrate through the silicon.

Due to zero distance between the sapphire (source of white light) and Silicon, white light burst laser pulses still keep their coherence and follow the geometry of the original beam until it diverges after exiting from the bottom of the silicon. White light produces a plurality of secondary wavelengths. The portion of the spectrum of white light that is unable to penetrate inside the Si, will lead to surface ablation of the Si. A 1064 nm wavelength laser can be used to produce a supercontinuum. Other ultrafast lasers having a wavelength different than 1064 nm also produce a supercontinuum when directed through a transparent layer that results in light with wavelengths greater than 1.3 µm which produce filamentation in Silicon. The filamentation produces photoacoustic compression processing of the Si below the transparent material.

Si by itself has very low white light conversion efficiency since it has very low third order nonlinearity. Using laser pulses having much higher peek power obviates the need for the aforementioned top layer. It is unnecessary to use the top layer and white light can be directly generated the top Si surface leading for penetration of higher wavelengths of the spectrum in the Si.

After all above observations, the new ultrafast laser is designed having 2 µm wavelength running in the burst mode. Ultrafast laser pulses form long filaments inside the Si wafer. The elongated modified zones can form internal scribing causing separation of wafers into smaller pieces.

One non-limiting example of the method is for laser processing a Silicon ingot and includes the steps of: providing a Silicon ingot, the Silicon ingot is cylindrically shaped and includes a side and a top flat surface; applying a laser beam having at least one ultrafast subpulse in a burst envelope, the burst envelope includes 1-50 subpulses, the subpulses in the envelope operating at a first wavelength, from a laser source having more than 1.3 µm wavelength; focusing the ultrafast subpulses beneath the top surface tightly to cause optical breakdown and void formation; performing a raster scan to cover all areas beneath the surface; creating a thin disk of damage zone beneath the top surface; creating a filament in the Silicon ingot using distributive lens focusing assembly into the Silicon ingot side cylindrical surface; and, creating relative movement between the distributive lens focusing assembly and the Silicon ingot creating a scribe line therearound. The filament scribing in the form of a ring around the ingot enables easy separation of silicon thin wafer from ingot.

Another non-limiting example of the method is for laser processing of Silicon, comprising the steps of: providing a Silicon substrate, the Silicon substrate includes a top surface; providing a Kerr material and placing the Kerr material into engagement with the top surface of the Silicon substrate forming an interface therebetween; applying a laser beam having at least one subpulse in a burst envelope, the burst envelope includes 1-50 subpulses, the subpulses in the envelope operating at a first wavelength, from a laser source through a distributive lens focusing assembly and to the Kerr material; and, modifying the first wavelength of the subpulses as the subpulses travel through the Kerr material such that the subpulses are emitted from Kerr material at the interface between the Kerr material and the top surface of the Silicon substrate at a plurality of second wavelengths, the plurality of second wavelengths being white light; a portion the plurality of the second wavelengths of the subpulses being greater than or equal to 1.3 µm; photoacoustic compression processing is produced by the laser pulse energy by the portion of the plurality of the second wavelengths being greater than or equal to 1.3 µm delivered through the interface and to the Silicon substrate which initiates Kerr Effect self focusing which is propagated in the Silicon substrate by additional energy input to the Silicon thus producing a filament within the Silicon substrate.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

While the present disclosure focuses primarily on silicon scribing, it is understood that the system and method described herein are equally applicable to the machining processes of drilling, dicing, cutting and scribing other substrates. The substrate can have different shapes.

BRIEF DESCRIPTION OF THE DRAWINGS

FIG. 1 is a diagrammatic representation of the present invention;

FIG. 2 is a representative side view of two orifices drilled by the laser arrangement of FIG. 1;

FIG. 3 is another diagrammatic representation of the present invention;

FIG. 4 is a diagrammatic view of the present invention utilizing a distributed focus lens arrangement;

FIGS. 13-14 show two configurations of the distribution of laser energy.

DETAILED DESCRIPTION OF THE INVENTION

Figure 5:
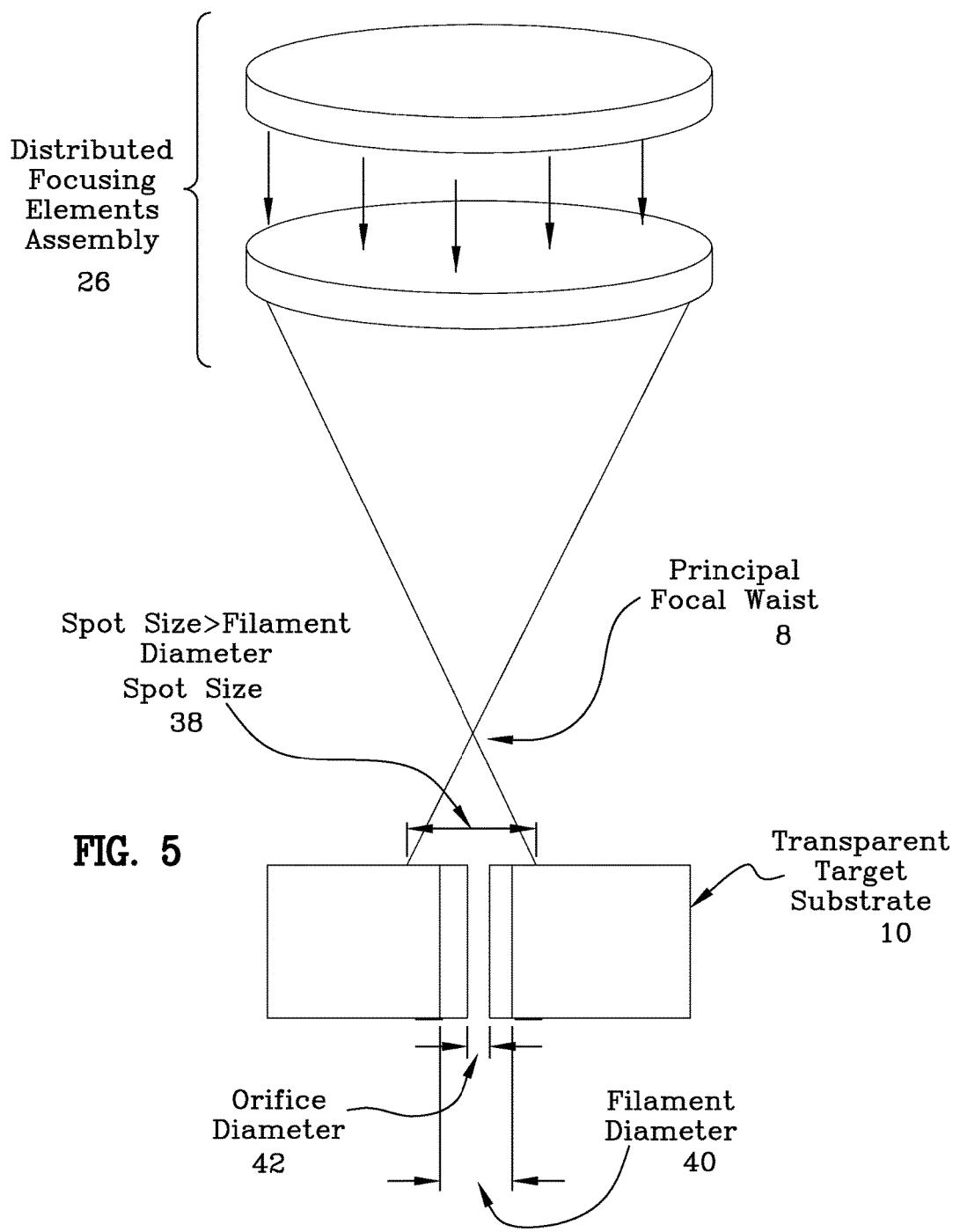
FIG. 5 is another diagrammatic view of the present invention utilizing a distributed focus lens arrangement.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In this respect, before explaining embodiments of the inventions in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Silicon has a transmission band after 1.3 μm, if short duration laser pulses with such a wavelength exist, they can propagate efficiently inside transparent materials, and locally induce modification inside the bulk by nonlinear absorption processes at the focal position of a lens. However, the propagation of ultrafast laser pulses (>1 MW peak power) in silicon is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPI/TI) of electrons from the valence band to the conduction band, plasma defocusing, and self-steepening. All these physical effects are observed with using ultrafast laser pulses at 1 μm wavelength in optical medias such as glass, [S L Chin et al. Canadian Journal of Physics, 83, 863-905 (2005)].

In addition to using a Silicon (Si) substrate, other materials such as SiC, glass, borosilicate glass, chemically or heat strengthened glass, sapphire, $LiNbO_3$, Silicon, Ti:Sapphire, $LiTaO_3$, transparent ceramics, crystalline rods and GaN, may be processed according to method disclosed herein. These materials can be in any geometric shape and the disclosed method is applicable to them in any geometrical shape.

Using ultrafast burst laser that can operate in the transmittance spectrum of the silicon will cause filament formation and result in acoustic compression internally along the scribe line that causes very nice and smooth scribing.

In this method, a burst of ultrafast pulses at 1 μm wavelength (pump) passes through a $LiNbO_3$ crystal that has very high third order nonlinearity, and based on phase matching, two wavelengths are created such that the sum of their frequencies is equal to the pump frequency. The two wavelengths are called the signal and the idler. Generally the signal has very low efficiency and it diverges more quickly than the idler. The beauty is both the signal and the idler are transparent to silicon.

The focus is adjusted such that the signal and idler cause the filamentation inside the silicon. The signal and the idler cause a much more pronounced filament resulting in easy cleaving. Using an OPA (optical parametric amplifier) will amplify either the signal or the idler using a pump. Using the OPA involves a more complicated setup than OPG (optical parametric amplifier), but the power level is sufficient to do the filamentation.

When ultrafast laser pulses propagate in an optical Kerr material, such as glass or sapphire or water, they undergo a nonlinear effect wherein the light at the center of the pulse travels slower than the light at the edges (sides) of the pulse. This causes self phase modulation of the pulse resulting in a variation of the pulse frequency.

Basically, nonlinear processes cause severe spectral broadening of the original laser beam that results in a smooth spectral continuum. The result is the creation of a light comprised of a plethora of different wavelengths known as white light or a supercontinuum. White light spectrum starts from UV range and extends to a couple of μm. Wavelengths below 1.3 μm are absorbed by silicon but longer wavelengths of the white light continue through the silicon channeling inside silicon. White light produces a plurality of secondary wavelengths.

If a Kerr type material such as sapphire (or glass), preferred thickness of 50 μm-500 μm, is placed on top of a silicon wafer, and bursts of ultrafast laser pulses are propagated into the sapphire, they will generate a white light (supercontinuum) that extends from the UV range from (200 nm in wavelength) into the IR range (up to 5 μm). If this is done while scribing or cutting sapphire by filamentation of burst ultrafast laser pulses, filamentation will also occur in the underlying silicon wafer if proper focusing is used. Obviously, the sapphire layer will be sacrificial, as it will have to be scribed in the same geometrical configuration as the underlying silicon.

Any cut is accomplished by initiation of an orifice with a laser fluence level that is capable of ablative processing for a desired distance and completing the drilling with a laser fluence level below the critical level for ablative processing yet above the critical level for photoacoustic processing to the desired depth in that material, combined with relative motion between the laser source and the target.

Cutting of silicon by a photoacoustic compression method of processing using an ultrafast white light source would be performed through the following steps:

1. applying a glass or sapphire sacrificial layer to at least one surface of a silicon target;
2. passing laser energy pulses from a laser source through a selected distributive-focus lens focusing assembly;
3. adjusting the relative distance and or angle of said distributive-focus lens focusing assembly in relation to a laser source so as to focus the laser energy pulses in a distributed focus configuration to create a principal focal waist and at least one secondary focal waist;
4. adjusting the principal focal waist or the target such that the principal focal waist will not reside on or in the sacrificial layer or the target that is being machined;
5. adjusting the focus such that the spot of laser fluence on the surface of the sacrificial layer and target, is located below or above said principal focal waist;
6. adjusting the spot of laser fluence on the surface of the sacrificial layer and target such that it has a diameter that is always larger than a diameter of a filamentation that is to be formed in the sacrificial layer and the target;
7. ensuring the fluence level of the secondary focal waists are of sufficient intensity and number to ensure propagation of a photoacoustic compressive processing through the desired volume of the sacrificial layer and the target; and 8. applying at least one burst of laser pulses of a suitable wavelength, suitable burst pulse repetition rate and suitable burst pulse energy from the laser source to the sacrificial layer through the selected distributive-focus lens focusing assembly, wherein the total amount of pulse energy or fluence, applied to the sacrificial layer at a spot where the laser pulse contacts the point of initiation of processing on the sacrificial layer, is greater than the critical energy level required to initiate and propagate a filamentation and photoacoustic compression processing through both the sacrificial layer and the silicon target, yet is lower than the threshold critical energy level required to initiate any ablative processing;
9. causing a relative movement between the silicon target and the laser source so as to cause the drilled orifice to develop into a cut line; and
10. stopping the burst of laser pulses and filamentation when the desired processing has been completed.

It is also envisioned that the above process could be carried out with ablative processing performed on the sacrificial layer and only photoacoustic compression processing performed on the silicon. In this situation step 8 would be modified as follows:

applying at least one burst of laser pulses of a suitable wavelength, suitable burst pulse repetition rate and suitable burst pulse energy from the laser source to the sacrificial layer through the selected distributive-focus lens focusing assembly, wherein the total amount of pulse energy or fluence, applied to the sacrificial layer at a spot where the laser pulse contacts the point of initiation of processing on the sacrificial layer, is greater than the critical energy level required to initiate ablative processing to the desired depth and thereinafter the fluence energy at the bottom of the ablatively drilled orifice in the sacrificial layer is greater than the critical energy level to initiate filamentation and photoacoustic compression processing through both the remainder of the sacrificial layer and the entire silicon target, yet is lower than the threshold critical energy level required to initiate any ablative processing.

Silicon by itself does not have strong Kerr nonlinearity but if higher peek power pulses are used, it is possible to generate white light on Si. In this case Si can be scribed using the longer wavelength of the spectrum of burst of ultrafast white light pulses. In this case there is no need to apply a sacrificial layer of Sapphire or glass on top of Si.

The Laser Processing Technology

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the term "photoacoustic drilling" refers to a method of processing a target (generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated ejecta and minimized microcrack formation in the material.

As used herein, the term "filament modified zone" refers to a filament region within a substrate characterized by a region of compression defined by the optical beam path.

As used herein, the phrases "burst", "burst mode", or "burst pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of pulses may be formed with variations in the intensities or energies of the pulses making up the burst.

As used herein, the term "substrate" means a transparent (to the wavelength) material target and may be selected from Silicon, Silicon Carbide, the group consisting of transparent ceramics, polymers, transparent conductors, wide bandgap glasses, crystals, crystalline quartz, diamonds (natural or man-made), sapphire, rare earth formulations, metal oxides for displays and amorphous oxides in polished or unpolished condition with or without coatings, and meant to cover any of the geometric configurations thereof such as but not limited to plates and wafers. The substrate may also be selected from the group consisting of biochips, optical sensors, planar lightwave circuits, optical fibers, silicon, 111-V semiconductors, microelectronic chips, memory chips, sensor chips, electro-optical lenses, light emitting diodes (LED), laser diodes (LD), and vertical cavity surface emitting laser (VCSEL). Targets or target materials are generally selected from substrates.

As used herein, "laser filamentation" is the act of creating filaments in a material through the use of a laser and that process or processes which can modify materials through compression by virtue of a filament forming event where the filament is of sufficient intensity to "move" material instead of "removing" material.

As used herein the "principal focal waist" refers to the most tightly focused and strongest focal intensity of the beam after final focusing (after passing through the final optical element assembly prior to light incidence upon the target). It may also be used interchangeably with the term "principal focus." The term "secondary focal waist" refers to any of the other foci in the distributed beam having a lesser intensity than the principal focal waist. It may also be used interchangeably with the term "secondary focus' or "secondary foci."

As used herein the term "sacrificial layer" refers to a material that can be removeably applied to the target material.

As used herein the term "processing" or "modification" encompasses the processes of drilling orifices, cutting, scribing or dicing a surface or volume of a target or substrate.

As used herein the term "focal distribution" refers to spatiotemporal distribution of incident light rays passing through a lens assembly that in its aggregate is a positive lens. Generally, subsequent convergence of spots of useful intensity is a function of the distance from the center of the focusing lens.

As used herein the term "aberrative lens" refers to a focusing lens that is not a perfect lens wherein the lens curvature in the X plane does not equal the lens curvature in the Y plane so as to create a distributed focal pattern with incident light that passes through the lens. A positive aberrative lens is a focally converging lens and a negative aberrative lens is a focally diverging lens, sometimes both but always at least one is required to create the linear array of orifices needed to scribe and dice materials as well as to create isolated orifices, not in an array.

Ultra short pulse lasers offer high intensity to micro machine, to modify and to process surfaces cleanly by aggressively driving multi-photon, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material. The filament formed by the fabrication unit's direction/steering can be used to drill orifices, cut, scribe or dice a surface or volume of a target.

Referring to FIG. 1, the present disclosure provides devices, systems and methods for the processing of orifices in transparent materials by laser induced photoacoustic compression. Unlike previously known methods of laser material processing, embodiments of the present invention utilize an optical configuration that focuses the incident beam 2 in a distributed manner along the longitudinal beam axis such that there is a linear alignment of the principal focus 8 and secondary foci 24 (coincident to the linear axis of the orifice but vertically displaced from the principal focus or focal waist) to allow the continual refocusing of the incident beam as it travels through the material thereby enabling the creation of a filament that modifies the index of refraction along the beam path in the material and does not encounter optical breakdown (as seen in the prior art ablative drilling systems both with and without the use of rudimentary or quasi-filamentation) such that continued refocusing of the laser beam in the target material can continue over long distances.

Still referring to FIG. 1, this distributed focusing method allows for the "dumping" or reduction of unnecessary energy 32 from the incident beam 2 found at the principal focal waist by the creation of secondary foci by the distributed focusing elements assembly, and by positioning the location of the principal focal waist from, on or in the material (sacrificial or otherwise in the present case), to outside the material. This dumping of beam fluence combined with the linear alignment of the principal focal waist and secondary focal waists, enables the formation of filaments over distances well beyond those using previously known methods (and well beyond 1 mm up to 10 mm) while maintaining a sufficient laser intensity (fluence $\mu J/cm^2$) to accomplish actual modification and compression over the entire length of the filament zone. This distributed focusing method supports the formation of filaments with lengths of 1-10 millimeters and yet maintaining an energy density beneath the optical breakdown threshold of the material with intensity enough so that even multiply stacked substrates can be drilled/machined simultaneously across dissimilar materials (such as air or polymer gaps between layers of target material with negligible taper over the drilled distance, and relatively smooth walled orifice walls that can be initiated from above, below or within the target material. See FIG. 2.

The optical density of the laser pulse initiates a self focusing phenomena and generates a filament of sufficient intensity to non-ablative initiate photoacoustic compression in a zone within/about/around the filament so as to create a linearly symmetrical void of substantially constant diameter coincident with the filament, and also causes successive self focusing and defocusing of said laser pulse that coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed where the orifice as it is forming also contributes to the "guiding" of the laser light down the length of the orifice being drilled or the scribe line being created by successive orifice formation.

It is known that the fluence levels at the surface of the target 10 are a function of the incident beam intensity and the specific distributed focusing elements assembly, and are adjusted for the specific target material(s), target(s) thickness, desired speed of processing, total orifice depth and orifice diameter. Additionally, the depth of orifice drilled is dependent on the depth over which the laser energy is absorbed, and thus the amount of material modified by a single laser pulse, depends on the material's optical properties and the laser wavelength and pulse length. For this reason a wide range of process parameters are listed herein with each particular substrate and matching application requiring empirical determination for the optimal results with the system and materials used. As such, the entry point on the target 10 may undergo some minimal ablative ejecta mound formation 20 if the fluence levels at the surface are high enough to initiate momentary, localized ablative (vaporized) processing, although this plasma creation and ablation is not necessary to the practice of this invention. In certain circumstances it may be desirable to utilize a fluence level at the target surface that is intense enough to create the transient, momentary ablative drilling to give a broad beveled entry and yet have the remainder of the orifice 22 of uniform diameter as would be created by a distributed focus hybrid drilling method using an energy level that permits a momentary ablative technique followed by a continued photoacoustic compression technique. This can be accomplished by the present invention by selection of a fluence level at the target surface that balances the linear absorption against the non linear absorption of the beam in the material such that the fluence level required for ablative processing will be exhausted at the desired depth of the beveled (or other geometric configuration). This hybrid technique will result in a minor ejecta mound 20 that can be eliminated if a sacrificial layer 30 is applied to the target surface. Common sacrificial layers are glasses, engineered oxides, wide bandgap materials, sapphire, resins or polymers and generally need only be in the range of 1 to 5000 microns thick (although the 10-30 micron range would be utilized for transparent material processing). The sacrificial layer will inhibit the formation of an ejecta mound on the target 10 by preventing molten debris from attaching itself to the surface, attaching instead to the removable sacrificial material as is well known in the art.

The present disclosure provides devices, systems and methods for the processing of orifices in transparent materials by ultrafast laser pulses filamentation which induces photoacoustic compression inside the target in the following non-limiting examples.

EXAMPLE 1

Figure 10:
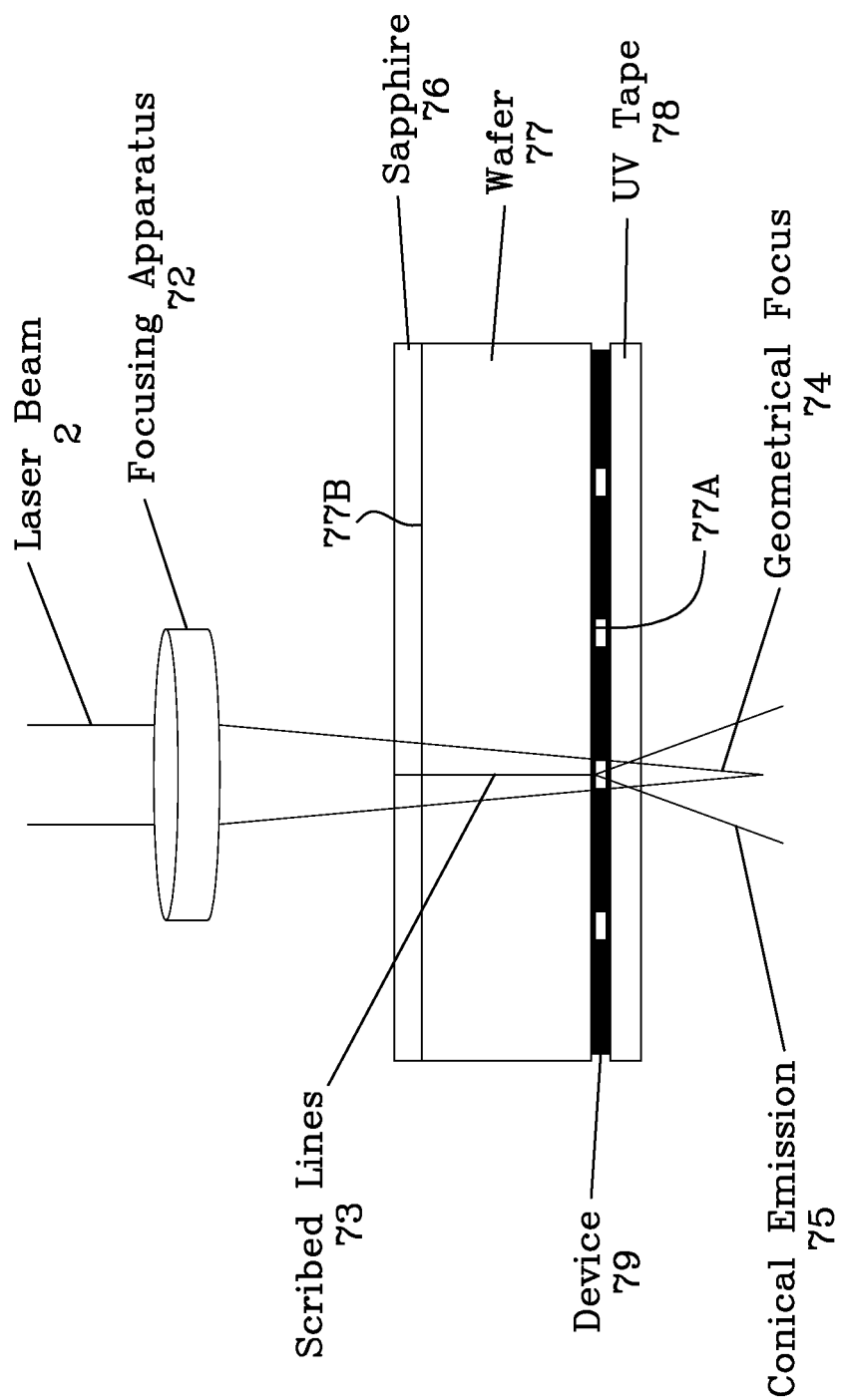
FIG. 10 is another diagrammatic representation of the present invention for processing a Silicon substrate using a sacrificial Sapphire layer and tape.

Referring to FIG. 10, a semiconductor wafer 77 that includes several devices 9 is covered with UV tape 78 on the device side. Sapphire 76 is layered on top 77B of the semiconductor wafer 77 as illustrated in FIG. 10. Sapphire is a Kerr medium. Unlike previously known methods of laser material processing, embodiments of the present invention utilize an optical configuration that focuses the incident beam 2 on the bottom or top of the substrate 77 but not within the substrate 77. Due to high peek power of the laser pulses which exceeds 5 MW (sufficient for self focusing in sapphire), the pulses immediately start self focusing on the Kerr medium 76. The nonlinear effects help focus the laser pulses of the laser beam below the diffraction limit and create filamentation in the sacrificial layer made of sapphire 76. The process creates combined white light generation and conical emission 75 just below the transparent silicon target 77.

The white light spectrum is partially absorbed by the silicon 77 on the top surface 77B but part of the spectrum of light that is transparent to the silicon 77 follows the filamentation geometry inside the silicon resulting in photoacoustic compression and orifice formation. The burst pulse envelope includes subpulses which play a very important role in that the subpulses which act upon the silicon do so such that the silicon is not relaxed when the next subpulse in the burst arrives and heat accumulation solidifies the filamentation. The sequential application of the subpulses means more pronounced orifice formation. Without limitation, filamentation also forms if only a single pulse is used, but the heat accumulation of multiple subpulses produces a better result.

By moving the beam or target in the appropriate direction, the orifices are formed beside each other resulting in a scribe line on both the sapphire 76 and silicon substrates. The scribe line width is on the order of 1 µm and this is very beneficial in populating more devices on a wafer by reducing the street width (distance between the devices) which is about 100 µm now and it is dreamed to reduce to 30 µm. With burst filamentation scribing the street widths can be set to 10 µm.

To accomplish photoacoustic compression processing requires the following system:
- A burst pulse laser system capable of generating a beam comprising a programmable train of pulses containing from 1 to 50 subpulses within the burst pulse envelope. Further the laser system needs to be able to generate average power from 5 to 200 watts depending on the target material utilized.
- A burst pulse laser with pulse duration of at least 15 ps but can be any value between 15 ps to 10 fs.
- A distributed focusing element assembly (potentially comprising positive and negative lenses but having a positive focusing effect in the aggregate) capable of producing a weakly convergent, multi foci, spatial beam profile where the incident fluence at the target material is sufficient to cause Kerr-effect self-focusing and propagation.
- An optical delivery system capable of delivering the beam to the target.

Commercial operation would also require translational capability of the material (or beam) relative to the optics (or vice versa) or coordinated/compound motion driven by a system control computer.

The use of this system to drill orifices or vias by photoacoustic compression requires the following conditions be manipulated for the specific target(s): the properties of the distributed focus element assembly; the burst pulsed laser beam characteristics; and the location of the principal focus.

The distributed focus element assembly 26 in FIGS. 1 and 10 in may be of a plethora of generally known focusing elements commonly employed in the art such as aspheric plates, telecentric lenses, non-telecentric lenses, aspheric lenses, annularly faceted lenses, custom ground aberrated (non-perfect) lenses, a combination of positive and negative lenses or a series of corrective plates (phase shift masking), axicon lens, any optical element tilted with respect to the incident beam, and actively compensated optical elements capable of manipulating beam propagation as well as any number of optical elements that produce a significantly non-ideal, non-gaussian beam intensity profile, not necessarily associated with coma.

The principal focal waist of a candidate optical element assembly as discussed above, generally will not contain more than 90% nor less than 20% of incident beam fluence at the principal focal waist. Although in specific instances the optical efficiency of the distributed focus element assembly 26 may approach 99%. FIG. 3 illustrates a non-aspherical, aberrated lens as would be used in the aforementioned process. The actual optical efficiency of the distributed focus element assembly 26 will have to be fine-tuned for each specific application. The users will create a set of empirical tables tailored for each transparent material, the physical configuration and characteristics of the target as well as the specific laser parameters—these tables can be computerized and used to drive a system via a central or distributed control architecture. Silicon Carbide, Gallium Phosphide, sapphire, strengthened glass etc., each has its own values. This table is experimentally determined by creating a filament within the material (adjusting the parameters of laser power, repetition rate, focus position and lens 34 characteristics as described above) and ensuring that there is sufficient fluence to induce a plane of cleavage or axis of photo acoustic compression to create an orifice. A sample optical efficiency for drilling a 5 micron diameter through orifice (as illustrated in FIG. 4) in a 2 mm thick single, planar target made of borosilicate with a 1 micron wavelength, 50 watt laser outputting a burst pulse (5 pulses) of 10 µJ energy per pulse having a frequency (repetition rate) that would lie in the 1 MHz range is 65% wherein the principal focal waist of the beam resides is in the range of up to 500 µm off of the desired point of initiation.

It is to be noted that there is also a set of physical parameters that must be met by this photoacoustic compression drilling process. Looking at FIGS. 4 and 5 it can be seen that the beam spot diameter 38> the filament diameter 40> the orifice diameter 42. Additionally the distributed beam's primary focal waist 8 is never in or on the surface of the target material 10 into which a filament is created, but can be located within a stack of materials where the waist resides in the space between layers, such as in an air gap.

The location of the principal focal waist 8 is generally in the range of up to 500 µm off of the desired point of initiation. This is known as the energy dump distance 32. See FIG. 1. It also is determined by the creation an empirical table tailored for each transparent material, the physical configuration and characteristics of the target as well as the laser parameters. It is extrapolated from the table created by the method noted above.

Figure 13:
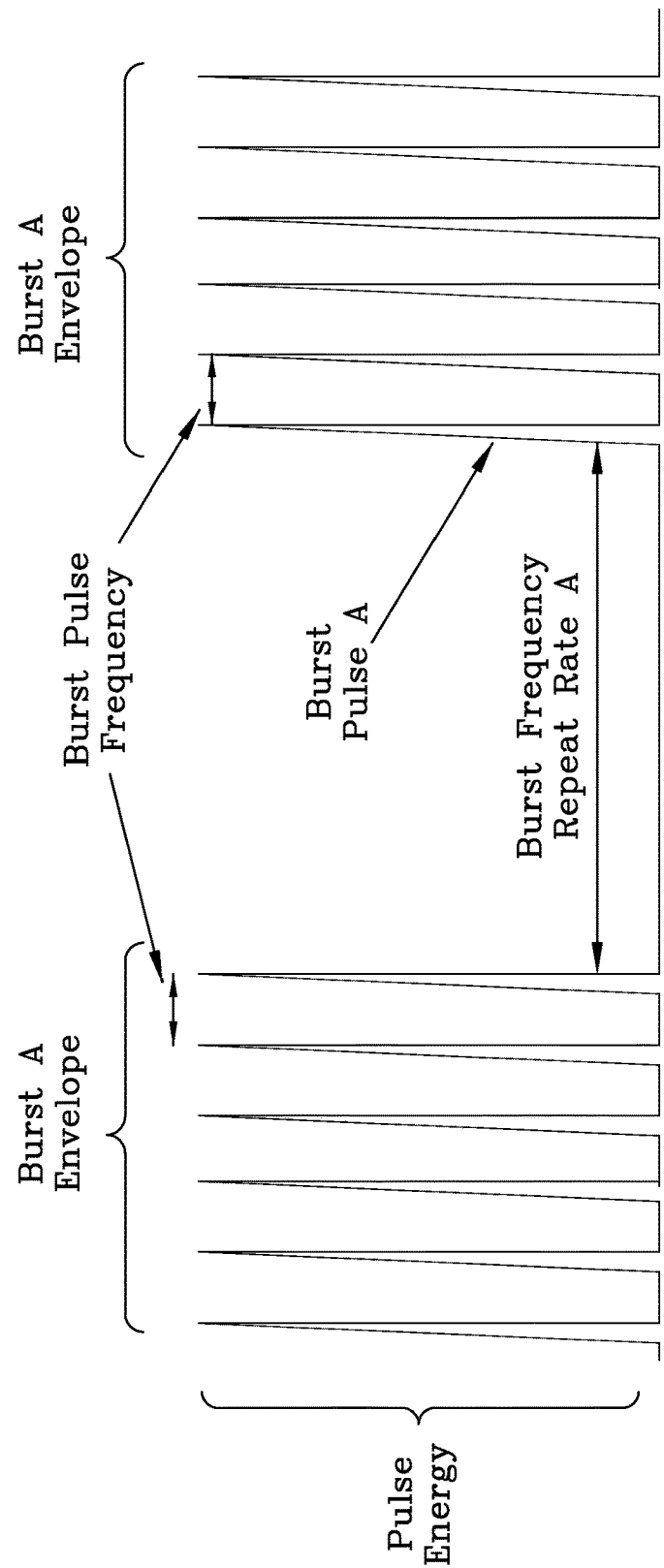

The laser beam energy properties are as follows: pulse energy in the beam is between 0.5 µJ to 100 µJ the repetition rate from 1 Hz to 2 MHz (the repetition rate defines the speed of sample movement and the spacing between neighboring filaments). The diameter and length of the filament may be adjusted by changing the temporal energy distribution present within each burst envelope. FIGS. 13 and 14 illustrate examples of two different temporal energy distributions of a burst pulsed laser signal.

Looking at FIGS. 6-9 collectively, the mechanism of the present invention can best be illustrated. Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament.

The actual physical process occurs as described herein. The principal focal waist of the incident light beam of the pulsed burst laser is delivered via a distributed focusing element assembly to a point in space above or below (but never within except in the gasp of air or polymer or liquid gaps in stacks of materials) the target material in which the filament is to be created. This will create on the target surface a spot as well as white light generation. The spot diameter on the target surface will exceed the filament diameter and the desired feature (orifice, slot, etc.) diameter. The amount of energy thus incident in the spot on the surface being greater than the critical energy for producing the electro-optic effect (Kerr effect—where the change in the refractive index of the material is proportional to the applied electric field) but is lower that the critical energy required to induce ablative processes and more explicitly below the optical breakdown threshold of the material. Photoacoustic compression proceeds as a consequence of maintaining the required power in the target material over time scales such that balancing between the self-focus condition and the optical breakdown condition can be maintained. This photoacoustic compression is the result of a uniform and high power filament formation and propagation process whereby material is rearranged in favor of removal via ablative processes. The extraordinarily long filament thus produced is fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target by focusing the energy of the secondary foci at a lower level below the substrate surface but at the active bottom face of the filament event. This allows the laser energy access to the bulk of the material while avoiding absorption by plasma and scattering by debris.

The distributed focal element assembly can be a single non-ideal focal lens placed in the path of the incident laser beam to develop what appears to be an unevenly distributed focus of the incident beam into a distributed focus beam path containing a principal focal waist and a series of linearly arranged secondary focal waists (foci). It might be as simple as creating a non-ideal, non-gaussian beam spot distribution in the region in or around the beam waist. In practice it is usually more than a single optical element and is usually several optical elements arranged along the beam's propagation axis.

Figure 6:
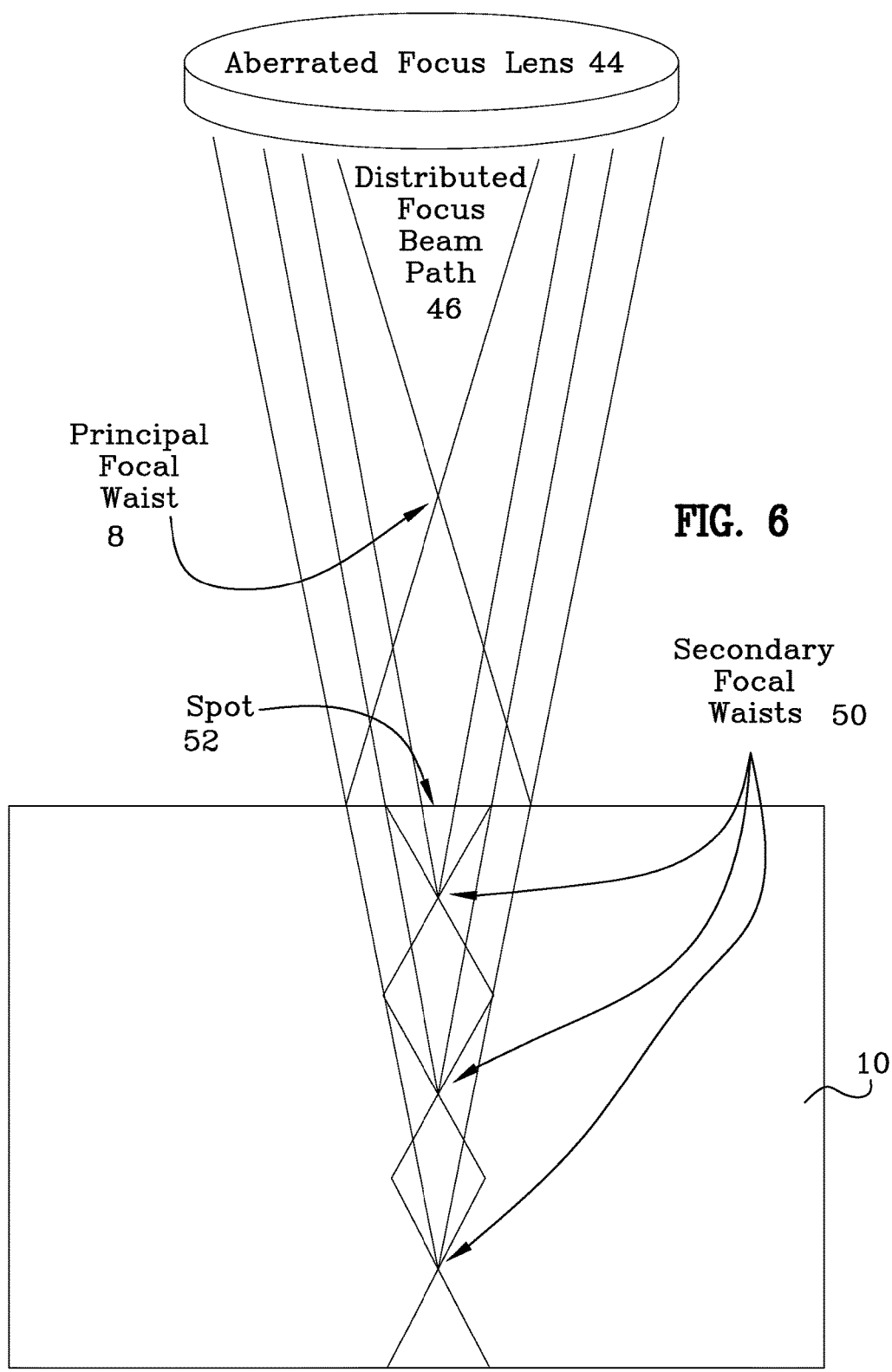
FIG. 6 is a diagrammatic view of the present invention utilizing a distributed focus lens arrangement and the distribution of focal waists where the principal focus is above the target.
Figure 7:
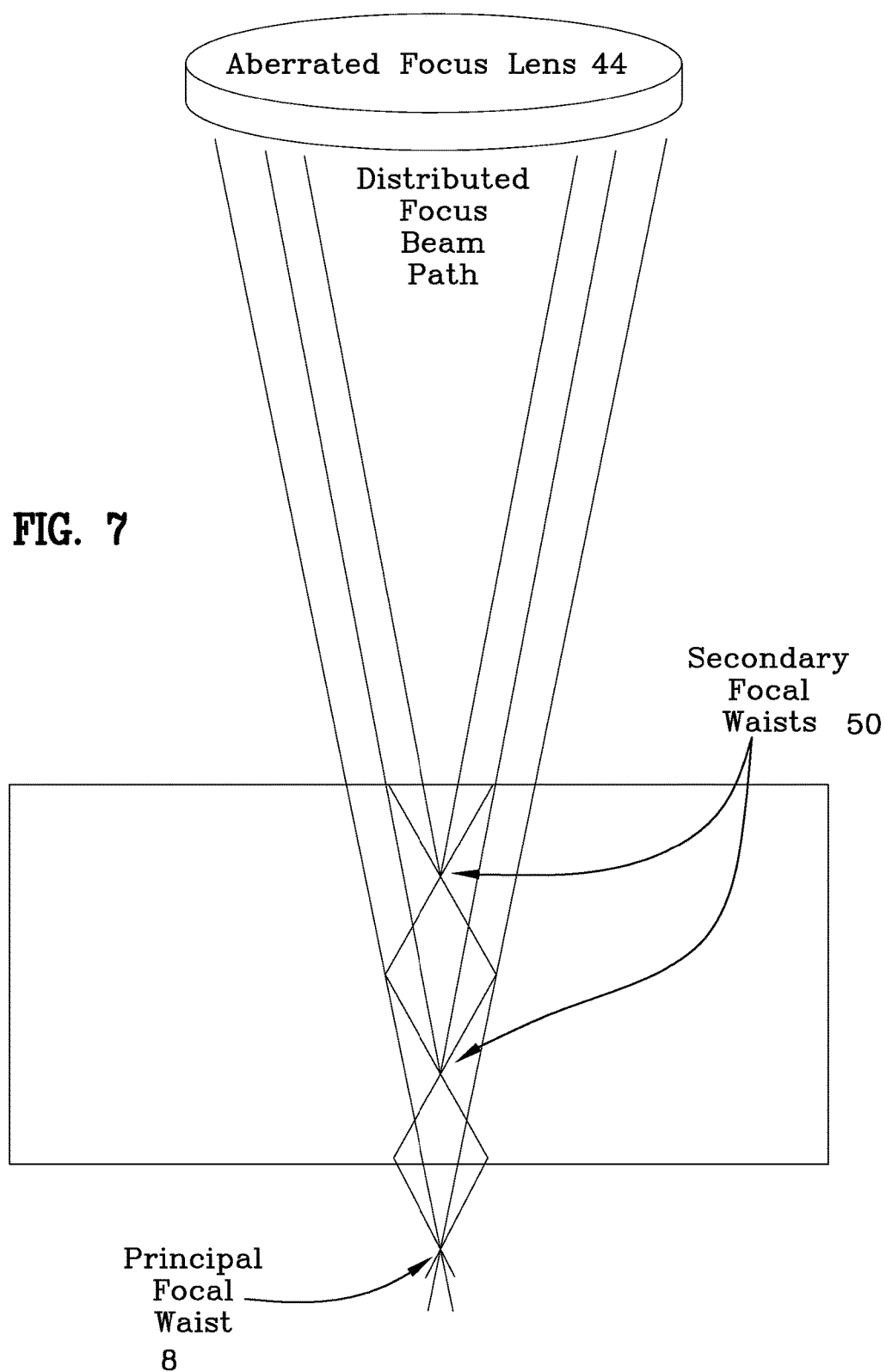
FIG. 7 is a diagrammatic view of the present invention utilizing a distributed focus lens arrangement and the distribution of focal waists where the principal focus is below the target.
Figure 8:
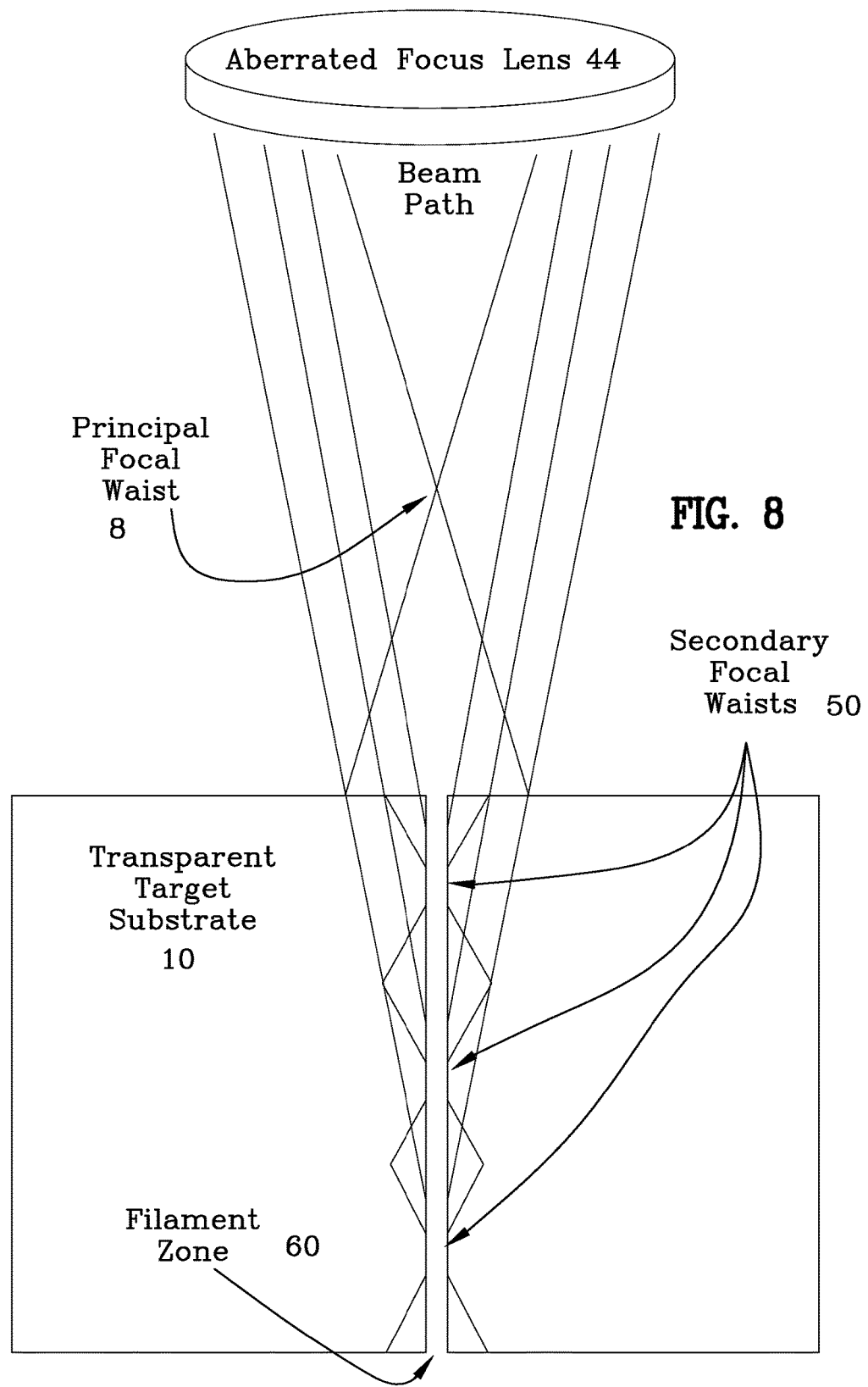
FIG. 8 is a diagrammatic view of the present invention of FIG. 6 wherein the orifice has been drilled.

The alignment of these foci is collinear with the linear axis of the orifice 42. Note that the principal focal waist 8 is never on or in the target material 10. In FIG. 6 the principal focal waist is above the target material and in FIG. 7 it is below the target material 10 as the orifice 42 may be initiated above or below the principal focal waist 8 by virtue of the symmetric and non-linear properties of the focused beam. Thus a beam spot 52 (approximately 10 µm distance) resides on the surface of the target 10 and the weaker secondary focal waists collinearly reside within the target because the material acts as the final optical element creating these focal points as the electric field of the laser alters the indices of refraction of the target. This distributed focus allows the amount of laser energy to be deposited in the material so as to form a filament line or zone 60. With multiple linear aligned foci and by allowing the material to act as the final lens, the target material when bombarded with ultrafast burst pulse laser beams, undergoes numerous, successive, localized heatings which thermally induced changes in the material's local refractive index along the path of the liner aligned foci causing a lengthy untapered filament 60 to be developed in the target followed by an acoustic compression wave that annularly compresses the material in the desired region creating a void and a ring of compressed material about the filamentation path. Then the beam refocuses and the refocused beam combined with the energy at the secondary focal waists maintains the critical energy level and this chain of events repeats itself so as to drill an orifice capable of 1500:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

Figure 9:
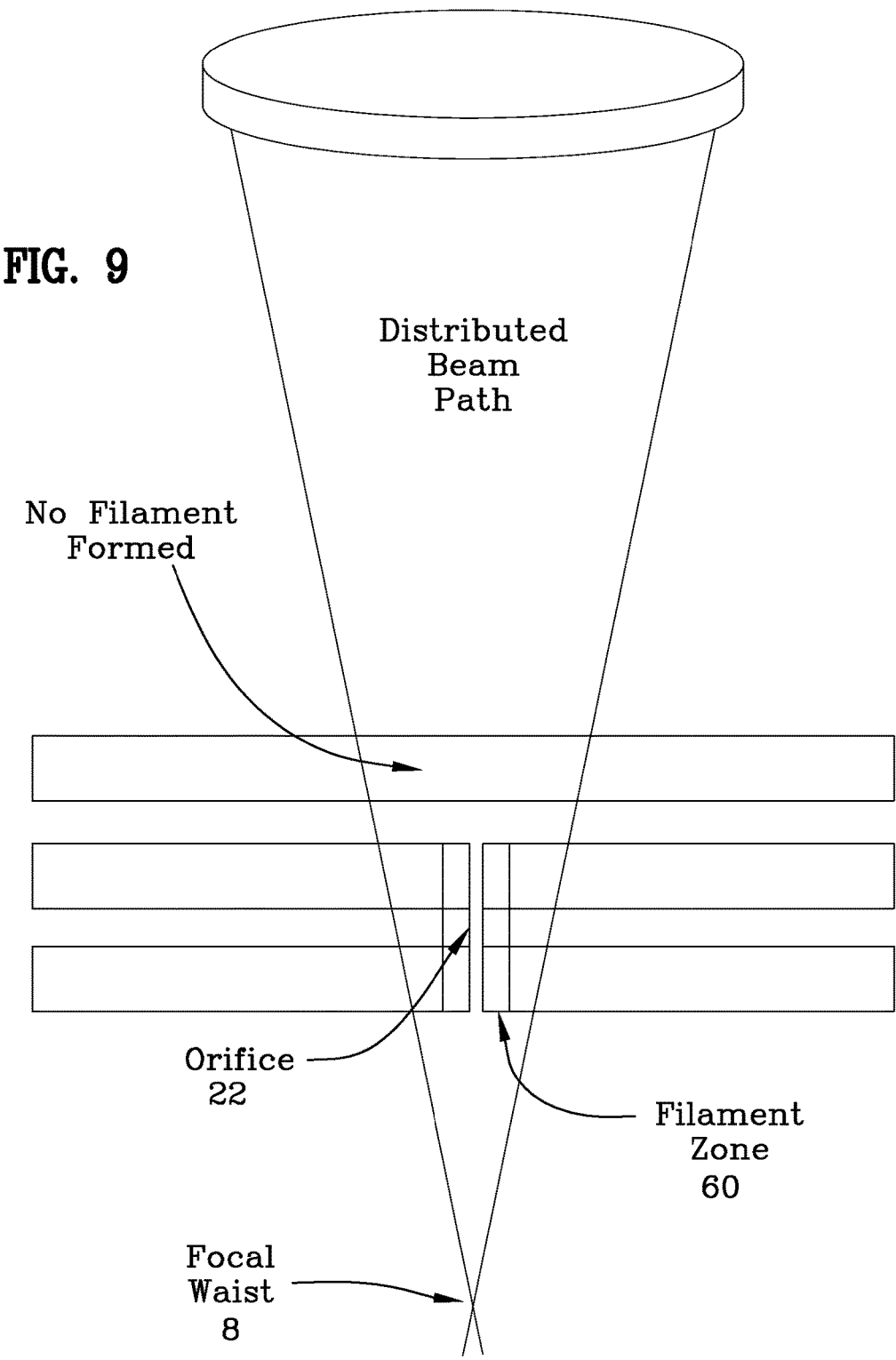
FIG. 9 is another diagrammatic view of the present invention utilizing a distributed focus lens arrangement and the distribution of focal waists where the principal focus is below multiple targets.

FIG. 9 illustrates the drilling of orifices in the bottom two of three planar targets 10 in a stacked configuration with an air gap between them wherein the principal focal waist 8 is positioned below the final target 10. The hole can be drilled from the top or the bottom or the middle of a multiple layer setup, but the drilling event always occurs the same distance from the principal focal waist if the same lens set and curvature is used. The focal waist is always outside of the material and never reaches the substrate surface.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

| Laser Properties | |
|---|---|
| Wavelength | 5 microns or less |
| Pulse width | 10 nanoseconds or less |
| Freq (laser pulse repetition rate) | 1 Hz to 2 MHz |
| Average power | 200-1 watt |
| Number of sub pulses per burst | 1 to 50 |
| Sub pulse spacing | 1 nanosecond to 10 microsecond |
| Pulse energy | 5 micro Joules (µJ) to 500 micro Joules (µJ) (Average power/repetition rate) watts/1/sec |
| Orifice Properties | |
| Min Orifice Diameter | .5 microns |
| Max Orifice Diameter | 50 microns |
| Max Orifice Depth | 10 mm in borosilicate glass |
| Typical Aspect Ratio | 1500:1 |
| Max Aspect Ratio | 2500:1 |

| | |
|---|---|
| Aberrated lens ratio | where the Cx:Cy ratio of the lenses are (−5 to 4,000) |
| Orifice Sidewall Smoothness (Material Independent) | <5 micron ave. roughness (e.g., Si, SiC, SiN, GaAs, GaN, InGaP) |
| Orifice Side Wall Taper (Material Independent) | Negligible across 10,000 micron depth |
| Beam Properties | |
| Focal Distribution | −5 to 4,000 |
| $M^2$ | 1.00-5.00 |

As noted earlier the parameters above vary with the target. In the way of an operational exemplary, to drill a 3 micron hole 2 mm deep in a transparent substrate the following apparatus and parameters would be used: 65 watts of average power; 80 µJ pulse energy; 8 subpulses per burst at 50 MHz; and a 100 kHz repetition rate. This would be focused with an aberrated lens delivering distributed foci over 2 mm of space (filament active zone is 2 mm long) focusing 5 microns to 500 microns above the top surface depending upon the material.

Figure 11:
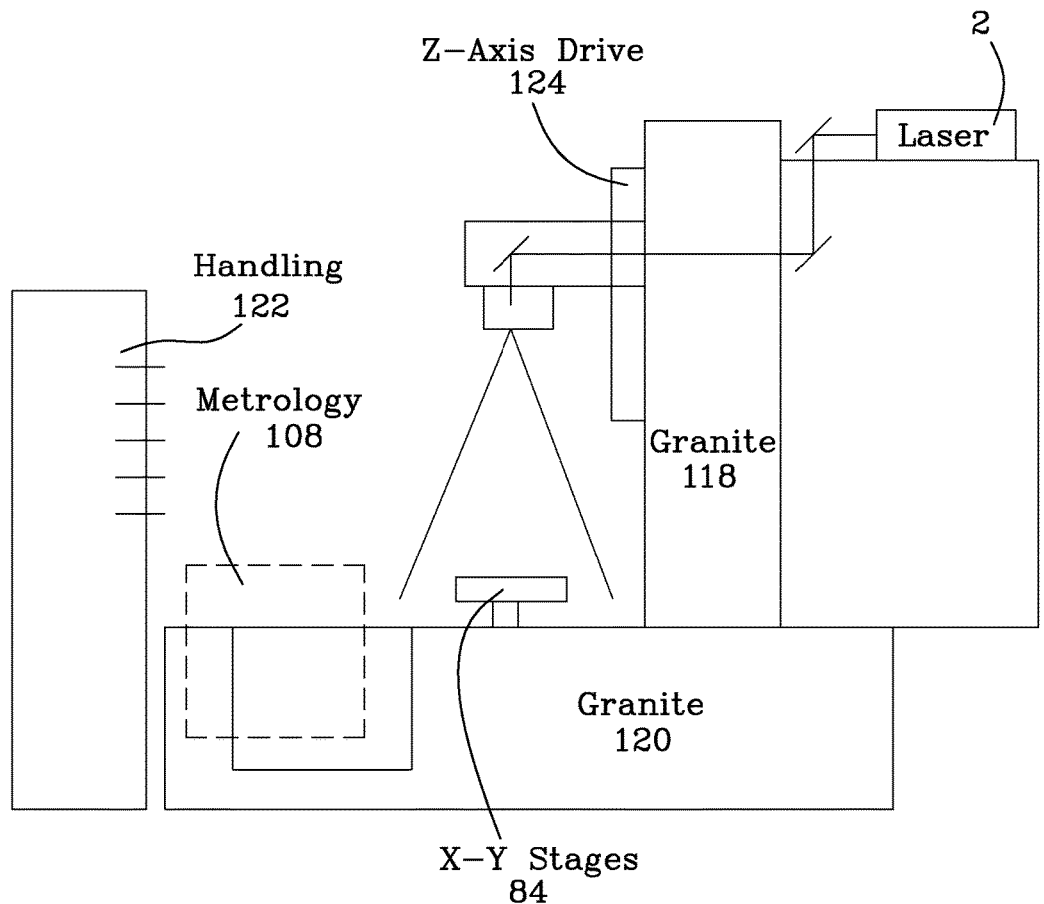
FIG. 11 is a diagrammatic representation of a laser processing system.

The apparatus of FIG. 11, with multi-axis rotational and translational control, when utilizing filamentation by burst ultrafast laser pulses to accomplish photoacoustic compression processing may be employed for the purpose of bringing the beam on to the work piece(s) at variable focus positions, non-normal angles of incidence and at variable, recipe controlled positions to create curvilinear zones of filament arrays, for the purpose of cutting the substrate. Those skilled in the art will recognize that all of these axes are not required for all applications and that some applications will benefit from having simpler system constructions.

Furthermore, it is to understood that the apparatus shown is but one example implementation of the embodiments of the present disclosure, and that such embodiments may be varied, modified or hybridized for a wide variety of substrates, applications and part presentation schemes without departing from the scope of the present disclosure.

It is to be understood that the invention is not limited in its application to the arrangements of the components set forth in the following description or illustrated in the drawings. The invention is capable of other embodiments and of being practiced and carried out with various different ordered steps. For example, while this patent addresses cutting Si with a laser working at appropriate wavelength of above 1.3 µm, it is known that the same process can be used for processing Ge, SiC, GaAs, GaN, GaP, InGaAlP, and other similar materials provided that the wavelength is transparent to the material. Additionally the same process can be used to cut bone provided that the wavelength is above 3 µm. The laser described herein need not be a white light laser and can operated with a wavelength other than the 1064 nm discussed herein.

Since photoacoustic compression does not cause tearing or separation in plastic based materials, it is highly advantageous in wafer dicing. Generally devices are formed on the substrate and covered by UV tape for protection and handling.

Referring to the prior art, the steps of making a new chip are as follows:
1. a thick wafer such as silicon is populated with chips using lithography techniques;
2. the device side of the wafer is covered with UV tape;
3. the wafer is back thinned until the proper thickness of the wafer is achieved;
4. after grinding (thinning the wafer), the UV tape is removed in a clean room and new UV tape is applied on the back side;
5. now the wafer is ready for dicing from the device side; at this point laser ablation or stealth dicing or diamond roller is used;
6. all the wiring in pad area needs to be machined, cut; always there is a possibility of flying debris on the device.

By using the new method of photoacoustic compression scribing, is it possible to do the above procedure in a reduced number of steps as shown in FIG. 10:
1. a thick wafer 77 such as silicon is populated by chips 79 using lithography techniques;
2. the device side 77A is covered with UV tape 78;
3. the wafer is back thinned (back side 77B) until the proper thickness of the wafer 77 is achieved;
4. the wafer 77 is scribed from the back side 77B; use of ultrafast laser burst pulses are used to scribe and, and at the same time, ablate the pad area for use by wiring;
5. the original UV tape 78 is still in use and the sample does not need to be processed in a clean room; no debris is emitted from the device side 77A since it is covered by UV tape 78;
6. the UV tape 78 stays intact and is not damaged after the laser scribing process; and,
7. laser to street adjustment can be done via confocal, IR microscope or just an ordinary microscope installed opposite to the laser beam.

FIG. 11 illustrates the layout of an example laser system suitable for part singulation. Laser 2 is capable of delivering bursts of subpulses, for example, with energies in the range of approximately 1 µJ-500 µJ per pulse, at a repetition rate of up to approximately 2 MHz.

Granite riser 128 is designed to be a reactive mass for dampening mechanical vibrations, as is commonly used in industry. This could be a bridge on which the optics above the stage can translate along one axis, X or Y relative to the stage, and in coordination with it. Granite base 120 provides a reactive mass that may support any or all components of system. In some embodiments, handling apparatus 122 is vibrational decoupled from the system for stability reasons.

Z axis motor drive 124 is provided for translating the optics (conditioning and focusing and scan optics if needed) in the Z axis relative to the servo controlled X-Y stage 84. This motion can be coordinated with the XY stage 84 and X or Y motion in the overhead granite bridge, and the XY motion of the stage on the granite base 20, which holds the sample material to be processed.

Stage 84 includes, for example, XY and Theta stages with a tilt axis, gamma ("yaw"). The motion of stages 84 is coordinated by a control computing system, for example, to a create part shape desired from a lager mother sheet. Metrology device 108 provides post processing or preprocessing (or both) measurements, for example, for mapping, sizing, and/or checking edge quality after cutting.

EXAMPLE 2

Making thin layers of wafers from a Silicon ingot is challenging. Presently, ingots are sliced using a saw and a lot of material is wasted. A proton beam is used to cut very thin layers of wafers but the proton beam process is expensive and difficult to do in a manufacturing environment.

Recently, it has been proposed that using optical breakdown by tight focusing of the beam inside the target beneath the top surface a region of defect along the cut line can be created. But separating the thin layer is challenging since there is no first initial scribing location.

Figure 12:
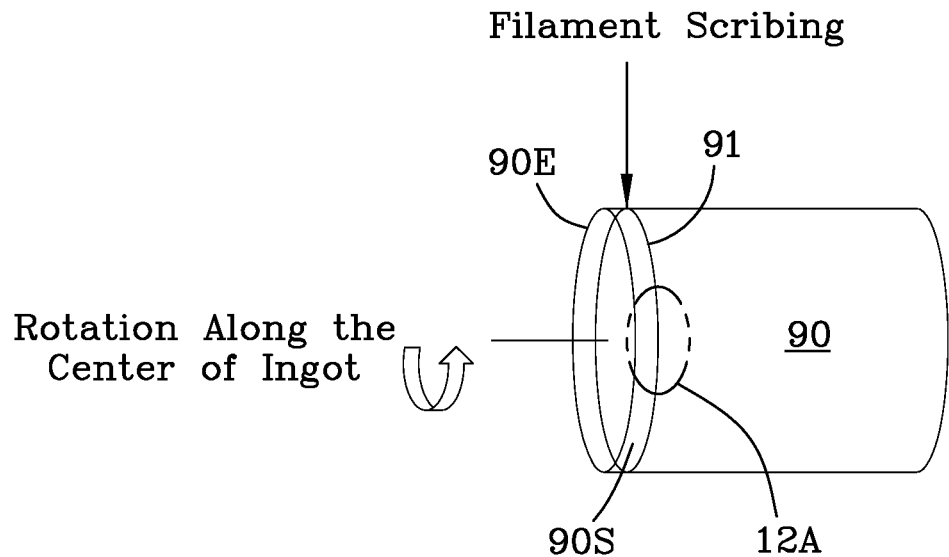
FIG. 12 is a schematic view of silicon ingot side scribing for easy slicing.
Figure 12A:
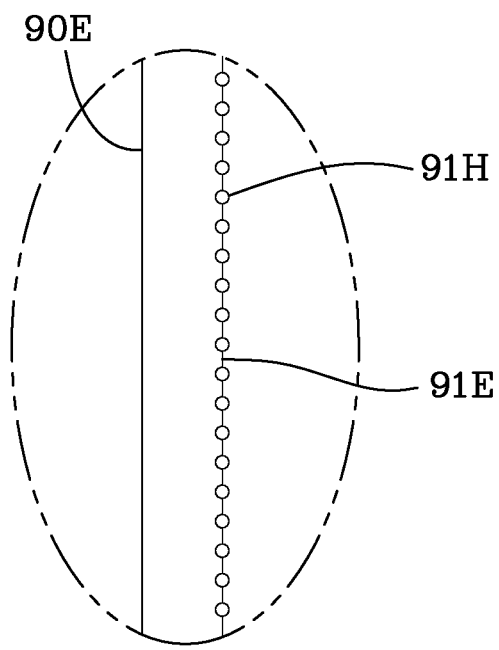
FIG. 12A is an enlargement of a portion of FIG. 12.

As shown in FIG. 12, it is possible to make a 2 mm long scribe 31 along the edge 90E of the ingot 90 which helps release the thin sheet 90S (wafer) from Silicon ingot 90. Again this can be done using an ultrafast burst laser running above 1.3 µm wavelength or using an OPG or applying Kerr layer on the wall of ingot and using typical wavelength to generate ultrafast burst white light laser as discussed in example 1. FIG. 12 illustrates a scribe line 91. FIG. 12A is an enlargement of a portion of FIG. 12 which shows the scribe line 91 which is comprised of a series of orifices 91H which enable cleaving of a thin sheet 90S. Cracks 91E are located between the orifices 91H and facilitate cleavage. The orifices can be 1 µm in diameter and the spacing of the orifices is 2-10 µm center to center.

EXAMPLE 3

This example is hole/orifice drilling in silicon via burst of ultrafast laser pulses. If a single burst of ultrafast laser as explained in example 1 is used, it will generate orifices with micron or submicron sizes. Percussion drilling can be done by firing many burst of laser pulses in single location. Photoacoustic compression melts and pushes the material toward the wall of the orifice resulting in much wider holes. Holes/orifices of 20 µm diameter are achieved using 500 laser pulses from bursts of laser pulses running at a repetition rate of 50 kHz, and, each burst of laser pulses has 8 pulses running at 50 MHz. Using a sacrificial layer is useful for a wavelength shift but also helps in preventing orifice taper in the silicon. No taper occurs in the orifices/holes created in the silicon, however, taper occurs in the sacrificial layer. Debris from the sacrificial layer is deposited on the sacrificial layer and leaves the silicon surface clean. If holes/orifices are created/punched about 2 to 10 µm apart, the present method can be used to cut very thick samples of wafers.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A method for laser processing of silicon, comprising the steps of:
   providing a silicon substrate, said silicon substrate includes a top surface;
   providing a Kerr material and placing said Kerr material into engagement with said top surface of said silicon substrate forming an interface therebetween;
   providing a laser source delivering a laser beam having between 1 and 50 subpulses in a burst envelope, said subpulses in said burst envelope having a first wavelength;
   delivering said laser beam through a distributive focusing assembly to said Kerr material and said silicon substrate, said distributive focusing assembly creating a principal focal waist and a plurality of linearly-arranged secondary focal waists (foci), said secondary foci having sufficient fluence in said Kerr material and said silicon substrate to form a filament and maintain said filament by continued refocusing; and,
   wherein as said subpulses travel through said Kerr material a plurality of second wavelengths are generated, said plurality of second wavelengths being white light; and,
   wherein a portion of said plurality of said second wavelengths of said subpulses being greater than or equal to 1.3 µm; and,
   wherein said portion of said second wavelengths being greater than or equal to 1.3 µm propagates in said silicon substrate by Kerr-effect self-focusing and additional energy input to said silicon substrate, each filament creating a void by annularly compressing silicon about said filament.

2. The method for laser processing of silicon, as claimed in claim 1, wherein said distributive focusing assembly is a single non-ideal lens.

3. The method for laser processing of silicon, as claimed in claim 1, wherein said distributive focusing assembly includes a plurality of optical elements arranged along the propagation axis of said laser beam.

4. The method for laser processing of silicon, as claimed in claim 1, further comprising the step of:
   selecting said Kerr material from the group consisting of glass, sapphire and water.

5. The method for laser processing of silicon, as claimed in claim 1, further comprising the step of:
   creating orifices in said silicon substrate with a consistent internal diameter.

* * * * *